(12) United States Patent
Jacob

(10) Patent No.: US 7,077,360 B2
(45) Date of Patent: Jul. 18, 2006

(54) PASSENGER SITTING/SLEEPING ARRANGEMENT

(76) Inventor: Emil Jacob, 395 Broadway #R1D, Cambridge, MA (US) 02139

( * ) Notice: Subject to any disclaimer, the term of this patent is extended or adjusted under 35 U.S.C. 154(b) by 0 days.

(21) Appl. No.: 11/026,251

(22) Filed: Dec. 30, 2004

(65) Prior Publication Data
US 2006/0000947 A1   Jan. 5, 2006

Related U.S. Application Data

(60) Provisional application No. 60/584,329, filed on Jul. 1, 2004.

(51) Int. Cl.
*B64C 11/00* (2006.01)

(52) U.S. Cl. .................................. 244/118.5

(58) Field of Classification Search ............ 244/118.6; 5/9.1, 10.1, 10.2, 118; 114/192, 189; 297/239
See application file for complete search history.

(56) References Cited

U.S. PATENT DOCUMENTS

| | | | | |
|---|---|---|---|---|
| 1,980,497 A * | 11/1934 | Musgrave | ........................ | 52/10 |
| 2,124,003 A * | 7/1938 | Helwig et al. | ........... | 244/118.6 |
| 2,326,972 A * | 8/1943 | Rosin | ........................... | 297/71 |
| 2,608,366 A * | 8/1952 | Jergenson | ................ | 244/118.6 |
| 2,817,389 A * | 12/1957 | Richards | ........................... | 52/8 |
| 2,953,103 A * | 9/1960 | Bohannon et al. | .......... | 105/315 |
| 3,784,989 A * | 1/1974 | LeGrand | ........................ | 5/9.1 |
| 4,066,227 A * | 1/1978 | Buchsel | ................... | 244/118.6 |
| 4,071,210 A * | 1/1978 | Mutke | ...................... | 244/118.6 |
| 4,686,908 A * | 8/1987 | Legrand | ....................... | 105/315 |
| 4,759,582 A * | 7/1988 | Kutzner | ......................... | 296/170 |
| 5,425,516 A * | 6/1995 | Daines | .................... | 244/118.6 |
| 5,716,026 A * | 2/1998 | Pascasio et al. | .......... | 244/118.6 |
| 6,000,174 A * | 12/1999 | Yamazaki | ........................ | 52/9 |
| 6,056,239 A * | 5/2000 | Cantu et al. | .............. | 244/118.6 |
| 6,237,872 B1 * | 5/2001 | Bar-Levav | ................ | 244/118.6 |
| 6,464,169 B1 * | 10/2002 | Johnson et al. | ........... | 244/118.5 |
| 6,616,098 B1 * | 9/2003 | Mills | ........................ | 244/118.5 |
| 6,848,654 B1 * | 2/2005 | Mills et al. | ............... | 244/118.5 |
| 6,851,134 B1 * | 2/2005 | Freller | ............................ | 5/9.1 |
| 6,932,298 B1 * | 8/2005 | Mills | ........................ | 244/118.5 |
| 2002/0033432 A1* | 3/2002 | Mikosza | ................... | 244/118.6 |
| 2003/0019976 A1* | 1/2003 | Cheung | .................... | 244/118.5 |
| 2003/0168281 A1* | 9/2003 | Olliges et al. | ................. | 182/97 |
| 2004/0012235 A1* | 1/2004 | Freller | ......................... | 297/232 |
| 2005/0178909 A1* | 8/2005 | Mills | ........................ | 244/118.6 |

* cited by examiner

*Primary Examiner*—Michael J. Carone
*Assistant Examiner*—S. A. Holzen
(74) *Attorney, Agent, or Firm*—Bernard J. Lacomis

(57) ABSTRACT

In accordance with the present invention, there is provided a passenger accommodation arrangement for aircraft which provides both a highly efficient use of available aircraft space and a high level of comfort for passengers. In particular, the novel arrangement allows passengers to easily and comfortably switch between sitting and sleeping positions. The arrangement provides for multiple compartments arranged transversely with respect to the longitudinal dimension of the aircraft. Each compartment includes a stair and multiple, individual passenger accommodation units arranged one above another on each side of the stair. Each unit contains structure which allows a passenger to switch between a sitting position, in which the passenger is supported on a seat surface, and a fully reposed position in which the passenger is supported on a substantially flat, horizontal sleeping surface. Conversion between sitting and sleeping positions is enabled by moveable sections which form part of the passenger bed in a first position and part of the passenger seat in a second position. Passenger units which are vertically adjacent to one another may include complementary and vertically aligned formations to optimize the usable height of the units.

20 Claims, 3 Drawing Sheets

PASSENGER SITTING/SLEEPING ARRANGEMENT

CROSS-REFERENCE TO RELATED PATENT APPLICATIONS

This application claims the benefit of Provisional Patent Application Ser. No. 60/584,329, filed on Jul. 1, 2004, the disclosure of which is incorporated in its entirety hereinto by reference.

BACKGROUND OF THE INVENTION

The invention relates to passenger accommodation arrangements for use in transportation vehicles such as aircraft, trains, busses and the like. More particularly, the present invention relates to passenger accommodation arrangements which easily permit a passenger to convert from a sitting position to a fully reposed sleeping position.

It has long been a goal of the passenger transportation industry cost effectively to provide comfortable seating and bedding arrangements for passengers. Given the ever increasing volume of long, non-stop flights over 6 hours in duration, it has become even more desirable to provide a truly restful passenger accommodation. Attainment of this goal has been difficult given the concurrent need to optimize the efficient use of space in aircraft. With current seating accommodations, passengers who desire to sleep during flights typically are forced to do so in positions which are either substantially upright or at various angles of repose short of horizontal. The inefficient seating/bedding arrangements of the prior art coupled with the pressure to maximize per-flight revenues have precluded adoption of volume-intensive solutions which would otherwise be available to allow achievement of these goals.

BRIEF SUMMARY OF THE INVENTION

The principle object of the invention is to provide a passenger accommodation arrangement which maximizes the comfort of passengers by providing the choice of both sitting and fully reposed sleeping positions in the same passenger accommodation unit.

A further object is to provide for a more comfortable passenger accommodation arrangement, particularly for use in passenger aircraft, which optimizes passenger revenues per unit of available space.

The above objects and others are achieved in the arrangement of the invention by vertically stacking individual passenger accommodation units one above the other and providing for access to the units by the passengers via a stair.

Space utilization efficiency is further increased by the use of compartments which include a stair and vertically stacked, individual passenger units located on both sides of the stair. The stair is used by passengers to access the individual, stacked units and has landings which function to aid the passenger in accessing the units. Multiple compartments are arranged along the longitudinal dimension of the aircraft as well as on both sides of the aisle of the aircraft. The number of units stacked one above the other is a function of the specific dimensions of the air into which the arrangement is installed. While space utilization efficiency is maximized by stacking as many units as possible on one another, passenger comfort is optimized by limiting the number of units so stacked. The optimum arrangement must take into account the available space in the aircraft.

The accommodation units each have a convertible sitting/sleeping structure. The passenger in the sitting position moves to the sleeping position by utilizing moveable sections which are common to both the sitting and sleeping structures. Specifically, a passenger in the sitting position first stands up on the landing in front of the unit, rotates hinged armrest portions of the seat downwardly to partly complete a sleeping surface, then rotates the backrest portion of the seat downwardly to complete the sleeping surface. Moving these common seat/bed portions from a first position to a second position forms a substantially horizontal flat sleeping surface which functions as a bed. The stair includes landings with enlarged surface areas which serve the dual function of providing access to the upper level accommodation units and of serving as a footrest for passengers in the sitting position.

BRIEF DESCRIPTION OF THE SEVERAL VIEWS OF THE DRAWINGS

A complete understanding of the present invention may be obtained by reference to the accompanying drawings, when considered in conjunction with the subsequent, detailed description, in which.

DETAILED DESCRIPTION OF THE INVENTION

Figure 1:
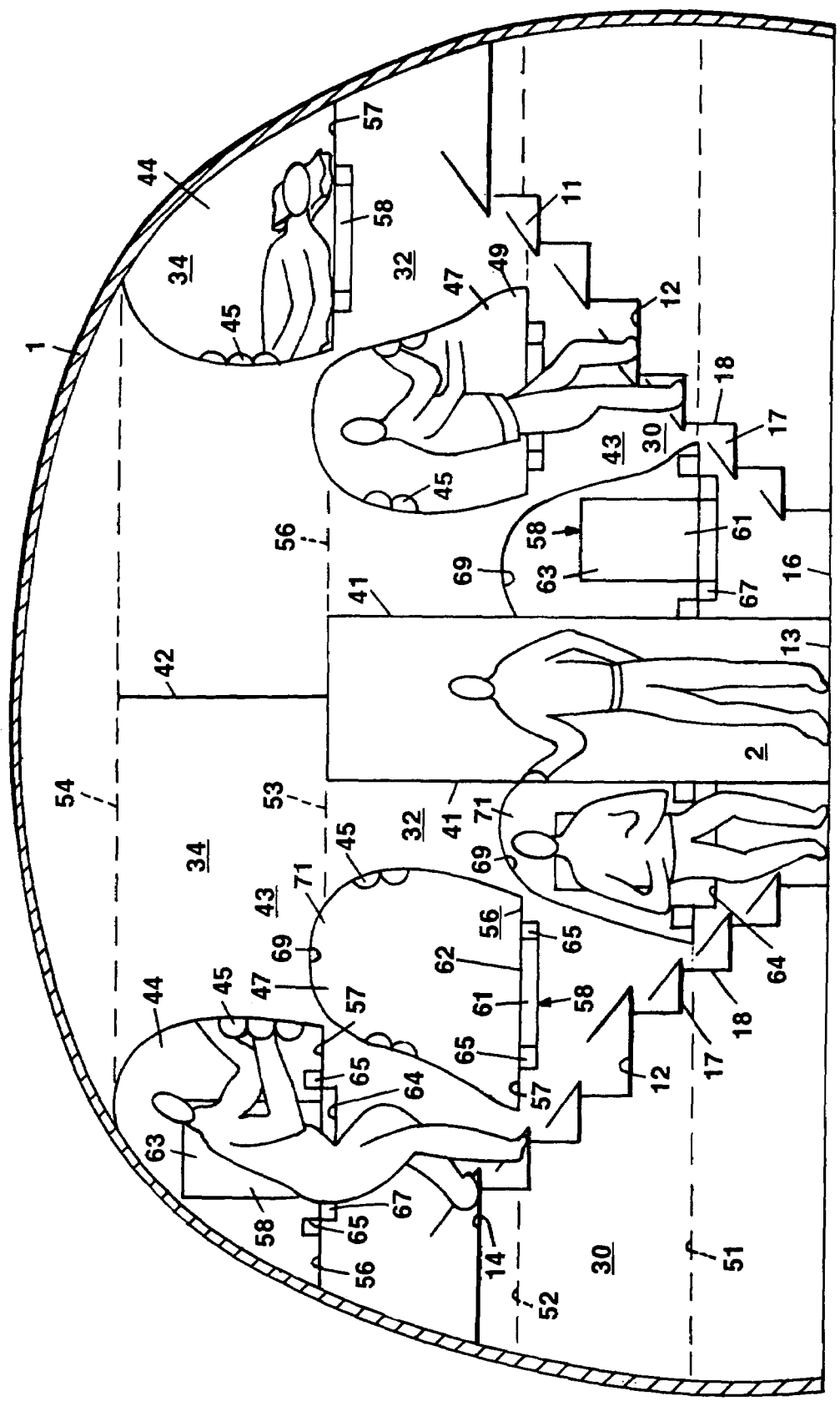
FIG. 1 is a cross section elevation view of the passenger seating/sleeping arrangement of the invention with passengers depicted within, entering and leaving the compartments on both sides of an aircraft aisle.

The passenger sitting/sleeping arrangement of the invention, as incorporated into a passenger transport aircraft, will now be specifically described with reference to FIGS. 1–3, wherein the same reference numbers will be used to identify similar functional components in the various structures. Referring to FIG. 1, the aircraft is seen to include a fuselage 1 and a longitudinally extending main aisle 13.

Figure 2:
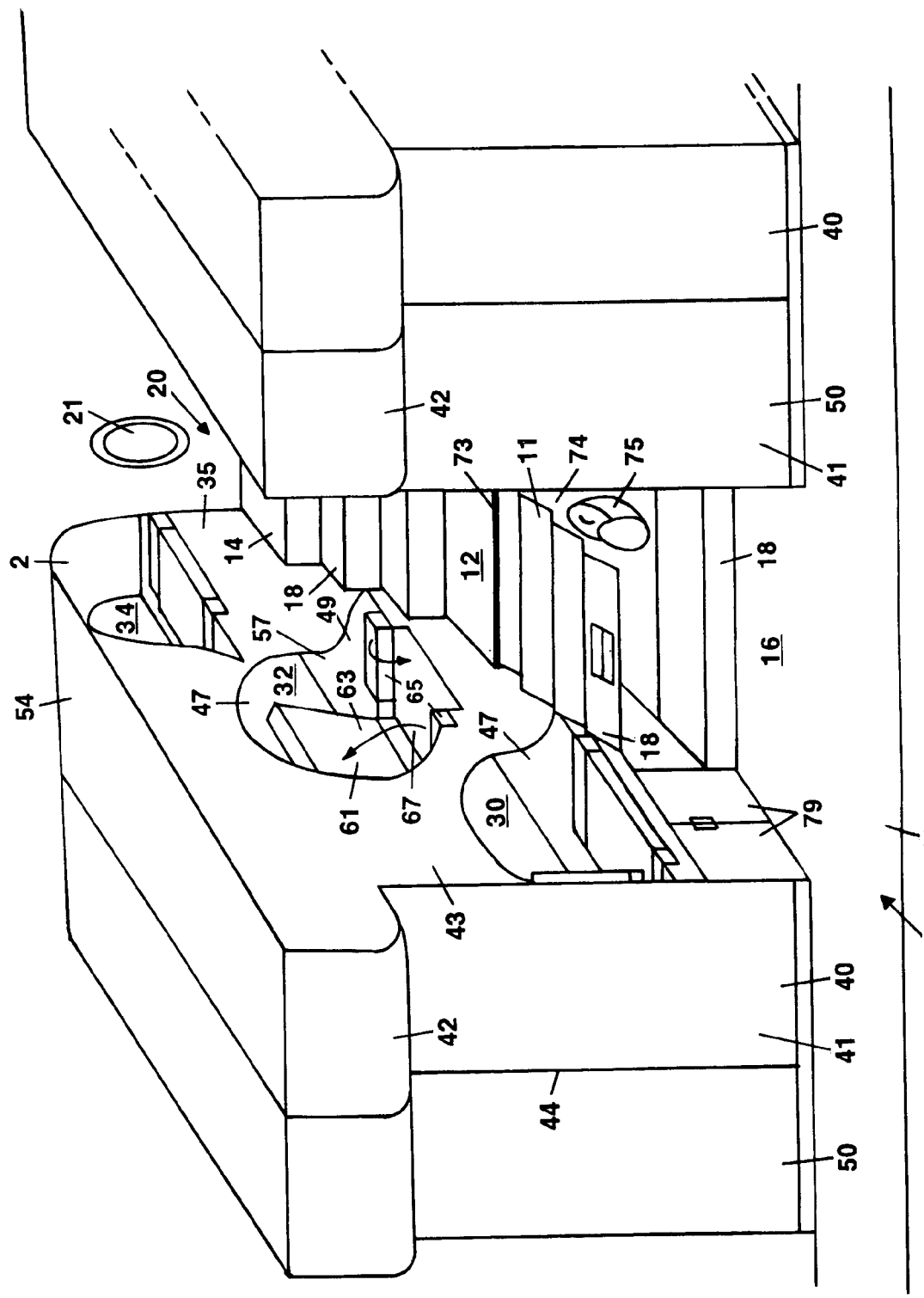
FIG. 2 is a perspective view of one unoccupied compartment of the passenger accommodation arrangement of the invention showing component parts of the seat/sleep units in various positions and showing the storage area under the stair.
Figure 3:
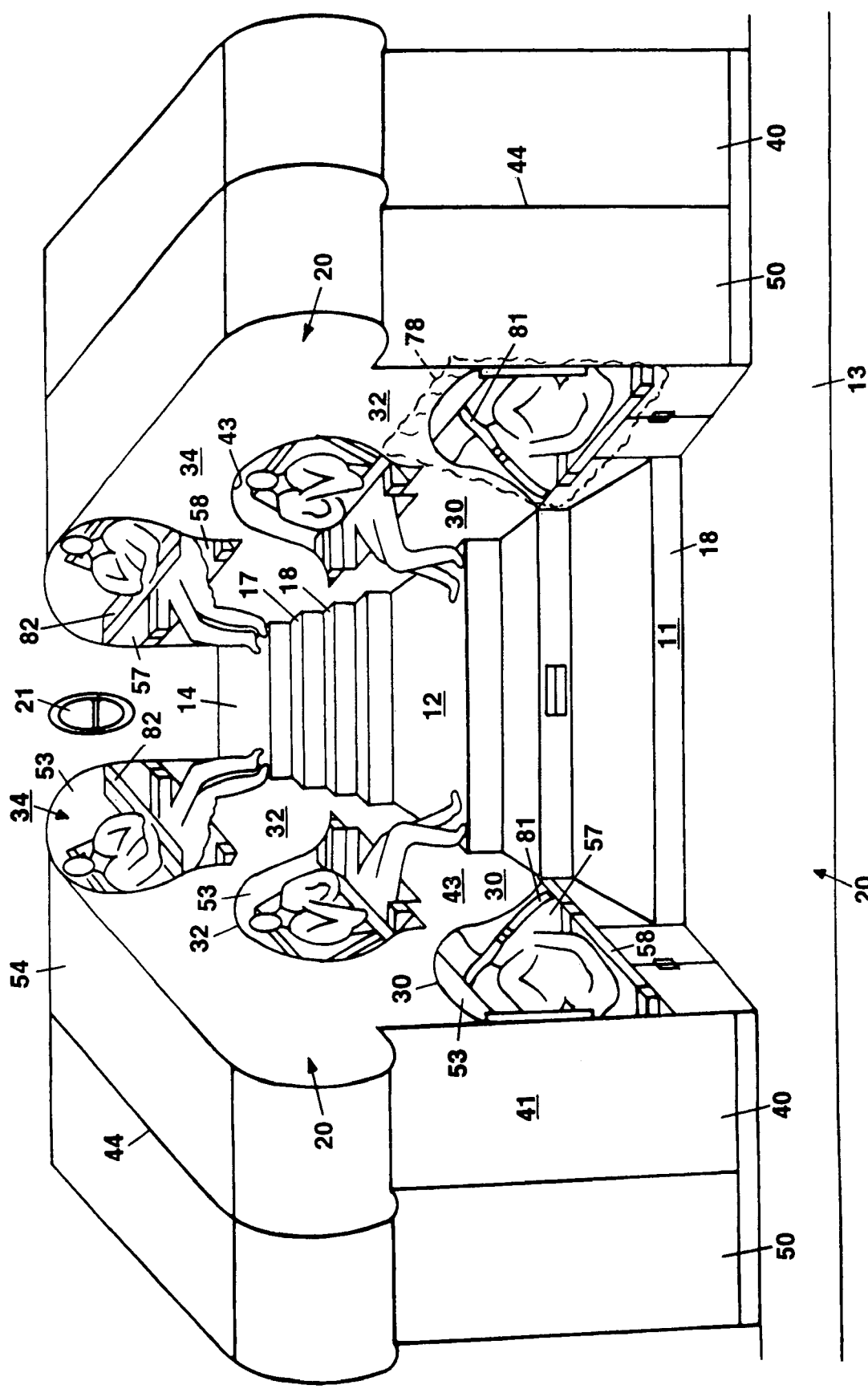
FIG. 3 is an illustrative, perspective view of a compartment with the width exaggerated at the bottom of the stair, tapering toward the top of the stair and showing passengers in different positions within the passenger accommodation units.

The passenger sitting/sleeping arrangement of the invention comprises a passenger compartment 20, as best seen in FIGS. 2 and 3. The compartment is made up of modules 40 and 50 together with a stair 11 located between the modules 40 and 50. It should be understood that the compartment 20 would usually be one of several similar passenger compartments arranged along at least part of, or perhaps the entire length of, the aircraft. Both the modules 40 and 50 and the stair 11 are arranged to have their longitudinal dimension extend in a direction generally transverse to and away from the main aisle 13 of the aircraft.

While the passenger accommodation compartments of the invention are described as being arranged along the longitudinal direction of the aircraft and transverse to the main aisle 13, it should be understood that the compartments of the invention could be used in conjunction with an entrance aisle that runs in other directions with respect to the fuselage depending on the configuration of the specific aircraft into which they are being built.

The bottom of stair 11 is located a pre-selected distance from the aisle 13 to form a threshold area 16 there between. The threshold 16 is large enough to serve as a comfortable foot rest for the passenger seated in the passenger unit 30 located adjacent thereto, as will be explained in greater detail below. The stair has the usual treads 17 and risers 18 and is inclined upwardly from the threshold 16 toward the far side of the aircraft with the exterior window or portal 21. The stair 11 has a part thereof hinged at an appropriate tread-riser intersection to move upwardly to expose a storage area 74 formed behind the stair, FIG. 2, into which suitable luggage or other items may be placed for storage purposes. Access to an additional storage area beneath the lowermost passenger unit 30 and adjacent to threshold area 16 may be provided through cabinet doors 79.

Each of the modules 40 and 50 is seen to be comprised of lower, middle and upper passenger accommodation units 30, 32 and 34, respectively. As will be appreciated from the description below, the passenger accommodation units making up the modules 40 and 50 are similar in construction except for their right or left orientation, i.e. their orientation with respect to the stair 11. In effect, the passenger units of each module making up the same compartment are entered and exited via the same stair, thus necessitating that the units which are otherwise similar in construction have openings and components which face that stair.

The stair 11 is constructed to have intermediate and upper landings 12 and 14 which are deeper than, and therefore have larger surface areas than the average surface areas of the treads 17 between these landings. The primary purpose of landings 12 and 14 is to provide passengers with safer entry to and exit from their assigned units 32 and 34. It should be noted that the landings 12 and 14 serve units 32 and 34, respectively, on both sides of the stair 11. Secondarily, the landings 12 and 14 provide a wider support for the feet of the passengers occupying units adjacent these landings when they are in the sitting position within the units. Thus, landing 12 provides these functions for the passengers occupying middle unit 32, while landing 14 provides these functions for passengers in the upper unit 34. In a similar fashion, the previously mentioned threshold 16, which is located directly in front of the seat for the lowermost unit 30, has a similar or larger surface area as and performs, for passengers in the lowest unit 30, the same functions provided by landings 12 and 14 for passengers in the upper units.

The module 40 generally comprises walls or partitions which are suitably shad and located to bound and define the various passenger accommodation units 30, 32, and 34. To this end, module 40 comprises an end wall 41 which, in the lower passenger units 30 and 32, faces and is adjacent to the aisle 13. The end wall 41 serves to separate the portions of the passenger units 30 and 32 nearest the aisle 13 from the aisle itself. The end wall 41 for the uppermost units 34 takes the form of a common end wall portion 42 located over the main aisle 13 This construction maximizes the length and volume of the uppermost units 34 opposite each other on each side of the aisle 13.

The overall dimensions of the compartment 20 (and therefore the module 40) will depend somewhat on the space available in the particular model aircraft into which it is being fitted. At the least, however, the compartment and module will be sufficiently large to comfortably accommodate each passenger in his assigned passenger accommodation unit, as well as providing ease and safety of entry to and exit from the units, as well as movement between sitting and sleeping positions, as described hereinafter.

Module 40 also includes walls or partitions 51–54, FIG. 1, which are arranged vertically with respect to each other. Wall 51 forms the bottom of passenger accommodation unit 30, while wall 54 forms the top wall of the uppermost unit 34. Intermediate walls 52 and 53 are common to adjacent units 30 and 32, and 32 and 34, respectively. Wall 52 is both the upper boundary for unit 30 and the lower boundary for unit 32. As such, wall 52 incorporates the structure necessary to provide the seating/sleeping functions for unit 32. In a similar manner, wall 53 incorporates structure required to provide the seating/sleeping function for passenger unit 34. In addition, wall 52 performs as a common wall separator between adjacent units 30 and 32, while wall 53 performs a similar common wall separation function between adjacent units 32 and 34. The specific structure incorporated into walls 51, 52 and 53 to provide the sitting/sleeping functions will be described in more detail below.

The walls 51, 52 and 53 of the passenger accommodation units 30, 32 and 34, respectively, are constructed to provide a generally horizontal, flat sleeping surface 56 which is formed by the combination of a fixed sleeping portion 57 and a moveable seat/sleep portion 58. The fixed sleeping portion 57 makes up the majority of the horizontal surface area of the sleeping surface 56 of the bed used by a passenger to sleep in the reposed position. The sleeping surface 56 incorporates a conventional soft, compliant material for providing a comfortable surface on which the passenger may sleep and which extends along substantially the entire length and width of the passenger units.

The sleeping surface 56 is generally the same in each of the compartments, except that the location of the movable seat/sleep portions 58 is displaced a greater or lesser distance from the aisle 13 as a function of the vertical height of the particular compartment into which it is incorporated. Thus, in the arrangement shown in FIGS. 1–3, the lower compartment 30 has its movable seat/sleep portion 58 nearest the aisle 13, while in the middle compartment 32 it is generally midway between the aisle and the far wall of the aircraft, and is farthest from the aisle in the uppermost compartment 34. The specific placement of the movable seat/sleep portions 58 in each compartment is a design choice which will depend in part on the dimensions of the aircraft being used.

The seat/sleep portion 58 of each compartment is movable by a passenger between two positions to provide different functions. To this end, the portion 58 is comprised of a combination backrest/sleep element 61 which is hinged to move between an elevated, upward position and a horizontal, downward position. The element 61 has two functional surfaces 62 and 63. The surface 62 functions as part of the sleeping surface 56 when in the horizontal, down position. For this purpose, it is shaped and constructed to become an indistinguishable part of the overall sleeping surface 56 when element 61 is in its horizontal position. When the element 61 is in its upward or vertical position, the surface 63 of element 61 acts as the backrest of a seat used by the passenger. Also, when element 61 is in its upward or backrest position, a recess 67 is exposed in the sleeping surface 56. The recess 67 has a seat bottom surface 64 which functions as a bottom support for a passenger in the seated position within his assigned unit. The surface 64, it should be noted, is at a level below the level of the sleeping surface 56. This provides additional vertical space for a seated passenger within the unit by increasing the usable distance between the surface 64, on which the passenger sits, and the top wall of the unit.

With the element 61 in its uppermost position, a passenger may sit in his assigned unit supported by the combination of the seat bottom surface 64 and the backrest surface 63. Since the passenger is seated in the recess 67 and below the level of sleeping surface 56, the clearance of the passengers head from the top wall of the unit is increased relative to what it would otherwise be without the recess 67 and recessed surface 64. To further increase this clearance, there may be provided in the top wall of the unit, generally directly vertically above the recess 67, an elongated dome or inverted U-shaped protrusion 69 into the above compartment. The dome does not emend across the full width of the unit, but rather runs from the front wall 43 back into the unit to an area approximately coextensive with the likely position of the head of a passenger or generally about one-half of the width of the unit. This creates another recess 71 which, in turn, results in an additional clearance between the passenger's head and the top wall of the unit at the small sacrifice of a slight deformation or protrusion into the adjacent unit vertically above the sleeping surface 56 thereof. The result of the combined clearances created by the optional formation 69 in combination with the recess 67 adds a relatively significant usable vertical space for a passenger in a seated position in the unit.

The seat/sleep portion 58 also comprises two armrests 65, each of which is rotatable between a first, upward position in which it operates as an armrest for a seated passenger and a second position in which it operates as part of the horizontal, flat sleeping surface 56. The surfaces of the armrests are suitably constructed to carry out these different functions in a manner similar to the different surfaces of the hinged movable element 61.

The module 40 has a back wall 44 which separates it from the adjacent module 50. Module 40 also has a front wall 43 adjacent the stair 11 which separates the passenger units 30, 32 and 34 from the stair 11 and to a lesser extent from each other. The front wall 43 is contoured to provide openings 47 having several functions. Primarily, the openings 47 are shaped to allow entrance and egress for the passengers with respect to their assigned units. Each of the openings 47 is similarly shaped and is generally located between a unit and either the landings 12 and 14 or the threshold 16. For this purpose, the openings 47 are shaped to form a notch 49 to allow additional space through which a passenger may move his/her feet when changing to the sleeping position from the sitting position as is readily apparent. The front wall 43 is also shaped to promote ease of movement by a passenger between the sitting and sleeping positions. The front wall 43 has mounted thereon, adjacent the stair, a series of brackets or hand graspable supports 45 to assist passengers in climbing the stair and entering or exiting the passenger units.

When a passenger in the seated position wishes to take up the sleeping position on the sleeping surface 56, the passenger would first stand on the landing associated with his unit. The passenger would first rotate the armrests 65 downwardly into the recess 67 and then also swing the backrest downwardly into the same recess to create an extension of the sleeping surface 56 in place of the seat and at the same level as the sleeping surface. The passenger would then sit back down onto the sleeping surface and swing his legs sideways and upwardly through the notch 49 in the front wall 43 while extending his legs fully onto the sleeping surface 56 and more fully into the unit. A curtain 84, FIG. 3, may be provided to be drawn across the opening 47 for privacy when the passenger is sleeping.

In standard fashion for conventional passenger aircraft, seatbelts 81 or other restraints may be provided, as appropriate or required. Likewise, serving trays 82 may be located for movement by a passenger into and out of position at appropriate times during flights.

The preceding description has presented in detail exemplary preferred embodiments of the invention and their application. Those skilled in the art will recognize that numerous alternatives encompassing many variations may readily be employed without departing from the scope of the present invention as set forth in the claims herein.

What is claimed is:

1. A passenger accommodation arrangement for an aircraft comprising a stair having a plurality of steps, said steps having laterally extending surfaces vertically spaced one above another, said surfaces not substantially overlying each other and arranged vertically and laterally with respect to each other along the direction of travel along said stair, and individual passenger sitting-sleeping units arranged one above the other on one side of said stair, said units extending in a direction generally parallel to the direction of travel along said stair having entrance portions substantially non-overlying each other, said entrance portions arranged with respect said steps to permit a passenger moving along said stair to enter different entrance portions from different steps along said stair.

2. The arrangement of claim 1, wherein at least two passenger units are located on each side of said stair to form, in combination with said stair, a compartment, at least one unit on each side of said stair being accessible by a passenger via said stair.

3. The arrangement of claim 1, wherein said stair forms a landing in front of at least one of said units, said landing having a surface area sufficiently large to serve as the footrest for a passenger in the sitting position in said at least one of said units.

4. The arrangement of claim 3, wherein the stair further includes a threshold area at the base of the stair, said threshold area serving as a footrest for passengers in the sitting position on the lowest of said units.

5. The arrangement of claim 1, wherein said stair moves to provide access to a storage area formed behind the stair.

6. The arrangement of claim 5, wherein said stair is hinged to pivot upwardly to permit insertion of items into the storage area.

7. The arrangement of claim 1, wherein said units comprise a bed and a seat, the bed including a substantially flat surface adapted to accommodate a passenger in the reposed position, said flat surface extending generally parallel to the direction of said stair.

8. The arrangement of claim 7, wherein the seat is formed by moving a seat forming section of the bed from a first position in which the top surface of the seat is generally coplanar with the top surface of the bed, to a second position which exposes an opening in the surface of the bed, said opening defined in part by a seat-surface located below the top surface of the bed to increase the vertical space.

9. The arrangement of claim 7, wherein said seat further includes arm rests located on each side of said passenger in the sitting position, said arm rests formed by moving two arm-rest portions of said bed from first positions in which they form part of the upper surface of the bed to second positions in which they form said arm rests.

10. The arrangement of claim 1 wherein said units include a front wall facing said stair, said front wall including openings for limiting access to said units only from different steps along said stair.

11. The arrangement of claim 2, wherein a plurality of compartments are located adjacent each other along the longitudinal dimension of said aircraft.

12. The arrangement of claim 10, wherein said front wall includes hand supports shaped to be grasped by a passenger ascending or descending the stair.

13. The arrangement of claim 1, wherein the aircraft includes an aisle extending longitudinally of said aircraft, said units extending in a direction perpendicular to said aisle.

14. The arrangement of claim 1, wherein said units include a first unit and a second unit, the first unit being adjacent to and vertically above the second unit and having a first generally horizontal sleeping surface occupying a first generally horizontal plane, the first horizontal sleeping surface having a portion extending above the first plane, a first recess in said second unit vertically adjacent said portion, said first recess operating to create an increased vertical space within said second unit generally directly below said portion.

15. The arrangement of claim 14, wherein said second unit includes a second generally horizontal sleeping surface occupying a second generally horizontal plane, and a passenger sitting surface extending below said second plane and vertically below said first portion to further increase the vertical space in said second unit between said sitting surface and said first portion.

16. A passenger accommodation arrangement for an aircraft comprising: a stair including steps vertically and laterally displaced from each other in the direction of travel along said stair, said steps having laterally extending surface vertically spaced one above another, said surfaces substantially non-overlying each other, and a plurality of passenger accommodation units, each unit located one above the other on one side of the stair, said units providing a sitting position in which said passenger faces said stair, said sitting position in any one unit not substantially overlying nay other sitting position, and a sleeping position in which said passenger extends parallel to the direction of travel along said stair, said stair providing a different step to serve as a footrest for passengers in the sitting position on different of said units, said stair being located with respect to said units to permit passengers to move directly from different steps of said stair into different sitting positions in different ones of said units.

17. A passenger accommodation arrangement for an aircraft comprising: a stair having a direction of travel generally perpendicular to the longitudinal axis of the aircraft, said stair having steps arranged vertically and laterally with respect to each other along said direction of travel, said steps substantially non-overlying each other, and a plurality of passenger accommodation units located one above the other alongside said stair, said stair located relative to said units to permit a passenger to move from different steps into different non-overlying portions of said units.

18. The passenger accommodation arrangement of claim 17, wherein said passenger units are located along both sides of said stair.

19. A method for accommodating passengers in an aircraft comprising the steps of: providing a plurality of separate passenger accommodation units arranged one above the other, each unit including an entrance portion substantially non-overlying any other entrance portion; providing a stair having a plurality of steps arranged vertically and laterally with respect to each other along the direction of travel of said stair, said steps substantially non-overlying each other; and forming and locating said entrance portions with respect to said stair such that passengers have direct access to different entrance portions only from different steps of said stair.

20. The method of claim 19 further including the step of arranging said stair to extend in a direction generally perpendicular to the longitudinal axis of said aircraft.

\* \* \* \* \*